US007795747B2

(12) United States Patent
Samila

(10) Patent No.: US 7,795,747 B2
(45) Date of Patent: Sep. 14, 2010

(54) METHOD AND APPARATUS FOR MOVING MATERIAL

(75) Inventor: John Samila, Porter, IN (US)

(73) Assignee: Ephaugh, Inc., Porter, IN (US)

( * ) Notice: Subject to any disclaimer, the term of this patent is extended or adjusted under 35 U.S.C. 154(b) by 527 days.

(21) Appl. No.: 12/002,527

(22) Filed: Dec. 17, 2007

(65) Prior Publication Data

US 2008/0191668 A1 Aug. 14, 2008

Related U.S. Application Data

(63) Continuation of application No. 11/766,945, filed on Jun. 22, 2007.

(60) Provisional application No. 60/900,674, filed on Feb. 9, 2007.

(51) Int. Cl.
*H02P 9/00* (2006.01)

(52) U.S. Cl. .................. 290/7; 290/5; 322/46; 318/141

(58) Field of Classification Search ..................... 290/5, 290/7, 45; 322/37, 49; 318/141, 145
See application file for complete search history.

(56) References Cited

U.S. PATENT DOCUMENTS 3,653,706 A * 4/1972 Kashiwagi et al. ......... 294/65.5
4,323,329 A * 4/1982 Chlad ......................... 414/737
4,647,268 A 3/1987 Scholl
5,624,323 A * 4/1997 Delaney et al. ............... 473/73
5,751,126 A 5/1998 Hellinger et al.
5,813,712 A * 9/1998 Mozelt ...................... 294/65.5
5,959,416 A 9/1999 Clutter et al.
5,998,944 A * 12/1999 Clutter et al. ............... 318/141
6,767,177 B2 * 7/2004 Opitz ......................... 414/737
7,731,451 B2 * 6/2010 Roberts ....................... 404/86
7,740,082 B2 * 6/2010 Davidson et al. .............. 171/18

FOREIGN PATENT DOCUMENTS

KR 20-1998-0042959 9/1998
KR 20-0220758 4/2001

OTHER PUBLICATIONS

U.S. Appl. No. 11/766,945, filed Jun. 22, 2007 entitled Method and Apparatus for Moving Material, 20 pages including drawings.
International Search Report and Written Opinion of PCT/US2008/002882 consisting of 8 pages.

* cited by examiner

*Primary Examiner*—Nicholas Ponomarenko
(74) *Attorney, Agent, or Firm*—Factor & Lake, Ltd.

(57) ABSTRACT

A method and apparatus for moving magnetic material includes an electromagnet for attaching and detaching the magnetic material where upon release of the magnetic material, the residual magnetic flux of the released magnetic material is reduced. The apparatus includes a generator coupled to the electromagnet. The generator includes a control input and an armature having a voltage output. A controller has an output coupled to the generator's control input and an input coupled to the armature voltage output, whereupon receiving a lift or release material signal from an operator interface panel to lift or release the magnetic material from the electromagnet, the controller transmits a control signal that is at least partially responsive to the voltage output of the armature to effectively maintain the voltage output of the armature to a set-point value.

4 Claims, 3 Drawing Sheets

METHOD AND APPARATUS FOR MOVING MATERIAL

RELATED APPLICATIONS

This application is a continuation-in-part patent application claiming priority benefit to the filing date of U.S. patent application Ser. No. 11/766,945, filed Jun. 22, 2007; which claims priority benefit to the filing date of U.S. Provisional Patent Application No. 60/900,674, filed Feb. 9, 2007; the contents of these applications are expressly incorporated herein by reference.

TECHNICAL FIELD

The present invention relates generally to the field of lifting devices and more specifically, to a method and apparatus for controlling an electromagnet of a machine for attaching, lifting, moving, releasing, and dropping magnetic material.

BACKGROUND OF THE INVENTION

The material handling industry utilizes a variety of mechanisms to lift, move, and place materials such as scrap or finished products. For relocating magnetic materials, e.g., diamagnetic metals, paramagnetic metals, and ferromagnetic metals; an electromagnet is preferable in many cases because it does not require personnel to position the chains, hooks, and other mechanical grasping mechanisms often utilized during the attachment and release of the magnetic material. Such grasping mechanisms can further mar metal surfaces and increase the possibility of product damage.

One drawback to using an electromagnetic lifting device is that the magnetic material may not be readily released by the electromagnet when its power source is removed. For instance, when the power source to the electromagnet is removed, the magnetic material will not immediately be released, but will eventually drop due to the force of gravity. As such, it is common to temporarily reverse the polarity of the electromagnet to repel or "push" the magnetic material from the electromagnet. The magnitude of the reverse charge can be significant and as a result, some magnetic materials—e.g., ferromagnetic—may be re-attracted to the now oppositely charged electromagnet and not drop; or if released, will retain an undesired residual magnetism. To effect a clean drop, several factors should be considered and compensated for, including, and not limited to the operating characteristics of the electromagnet and the generator, as well as the load, temperature, and velocity of the generator.

The present invention is provided to address these and other issues.

SUMMARY OF THE INVENTION

The present invention is a method and system for moving material. More specifically, the system is directed to a controlling device for moving magnetic material and includes a voltage generator coupled to an electromagnet. The generator has a control input and an armature having a voltage output, which is coupled to a sensor. A controller is coupled to the generator's control input, e.g., field windings, and the sensor. The controller further includes a first input coupled to a set-point value and a second input coupled to the armature's voltage output. An output control signal of the controller is coupled to the generator control input and is responsive to a comparison of the first input and the second input, wherein the output control signal to the generator continuously maintains the generator's voltage output to be substantially equal to the set-point value. That is, the generator armature output voltage is monitored and compared to the set-point value wherein the control signal to the generator is adjusted—if need be—to maintain the armature output voltage substantially equal to the set-point value.

Another aspect of the present invention includes a method for controlling a moving device for lifting and dropping magnetic material. The lifting device includes an electromagnet coupled to a voltage generator having a control input and a voltage output. A set-point value is provided to a controller of the lifting device. Upon the receipt of a drop material signal from an operator interface, a control signal is transmitted from the controller to the generator control input. The voltage at the output of the generator armature is monitored and a comparison is made between the generator armature voltage output and the set-point value. Adjustment of the control signal—in response to the comparison of the voltage at the generator armature output and the set-point value—maintains the generator armature output voltage substantially equal to the set-point value.

In another aspect of the present invention, the preferred set-point value is a substantially linear voltage ramp signal having a constant slope or rate of 100V/s and a duration of approximately two seconds. The duration and ramp rate of the set-point value can also be varied.

An object of the present invention is to provide a means to facilitate the relocation of magnetic material.

A further object of the present invention is to provide a magnetic means to facilitate the relocation of magnetic material, whereupon the release of the magnetic materials, substantially all the lifted magnetic material is dropped from the electromagnet.

Another object of the present invention is to utilize an electromagnet to attach, lift, move, place, release, and drop magnetic materials; whereupon the release of the magnetic materials, the extent of residual magnetism retained by the magnetic materials is reduced to a desirable level.

These and other aspects and attributes of the present invention will be discussed with reference to the following drawings and accompanying specification and claims.

DETAILED DESCRIPTION OF THE EMBODIMENT

Figure 1:
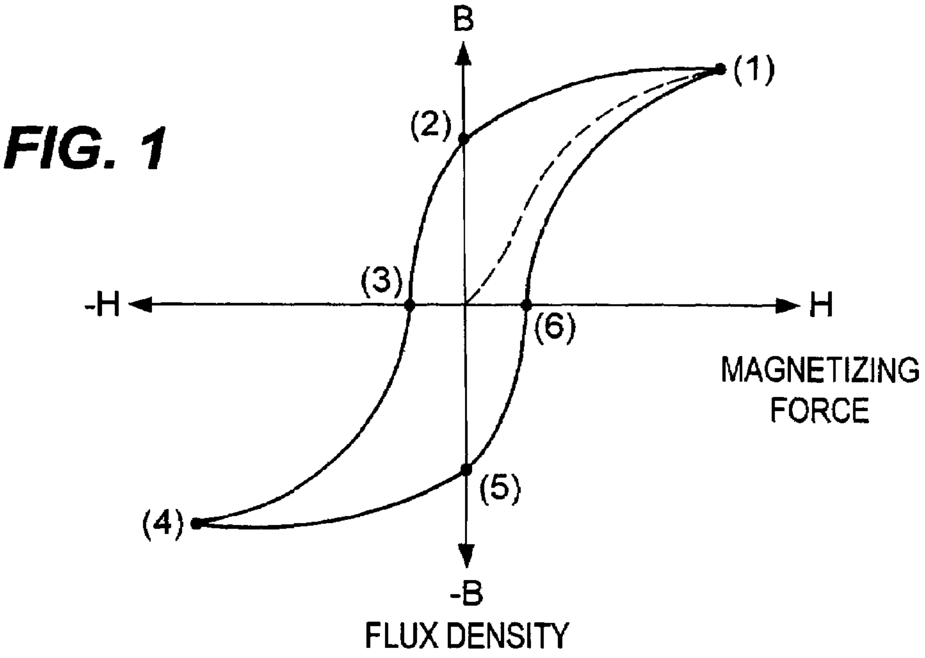
FIG. 1 is a graphic illustration depicting the relationship between an induced magnetic flux density and a magnetizing force.

While the present invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

One embodiment of the present invention is directed to a system for moving magnetic material. The magnetic material is attracted to an electromagnet, lifted, moved to another location, and released from the electromagnet. Preferably, upon release of the magnetic material, all the lifted material is dropped from the electromagnet and any extent of residual magnetic flux retained by the dropped magnetic material is reduced to a desirable level.

FIG. 1 is a graphic illustration of an exemplification depicting the known relationship between an induced magnetic flux density (B) and a magnetizing force (H) that occurs during the attraction and repulsion of a magnetic material. A hysteresis loop is generated by measuring the magnetic flux of a magnetic material, e.g., ferromagnetic, while the magnetizing force is changed. Ferromagnetic material that has never been previously magnetized or has been thoroughly demagnetized will follow the dashed line as the magnetizing force is increased. The greater the amount of magnetizing force, the stronger the magnetic field in the component. At point (1), almost all of the magnetic domains are aligned and any additional increase in the magnetizing force will produce very little increase in magnetic flux. Here, the material has reached the point of magnetic saturation. When the magnetizing force is decreased to zero, the curve will move from point (1) to point (2). At point (2), some magnetic flux remains in the material even though the magnetizing force is zero. This is referred to as the point of retentivity and indicates the level of residual magnetism in the material. That is, some of the magnetic domains remain aligned, but some have lost their alignment. As the magnetizing force is reversed, the curve moves to point (3), where the flux has been reduced to zero. This is known as the point of coercivity, wherein the reversed magnetizing force has flipped enough of the domains such that the net flux within the material is zero.

As the magnetizing force is increased in the negative direction, the material will again become magnetically saturated but in the opposite direction, point (4). Reducing the magnitude of the magnetizing force to zero brings the curve to point (5), and further increasing the magnitude of the magnetizing force in the positive direction will return the flux density to zero, point (6). The curves does not return to its origin because some force is required to remove the residual magnetism and the curve will take a different path from point (6) to the saturation point of point (1).

From the representative hysteresis loop shown in FIG. 1, several magnetic properties of a material can be determined: (a) retentivity is a material's ability to retain a certain level of residual magnetic field when the magnetizing force is removed after achieving saturation, i.e., the amount of flux density at point (2); (b) residual magnetism or residual flux is the magnetic flux density that remains in a material when the magnetizing force is zero; and, (3) coercive force is the amount of reverse magnetic field that must be applied to a magnetic material to make the magnetic flux return to zero, i.e., the amount of magnetizing force at point (3).

Figure 2:
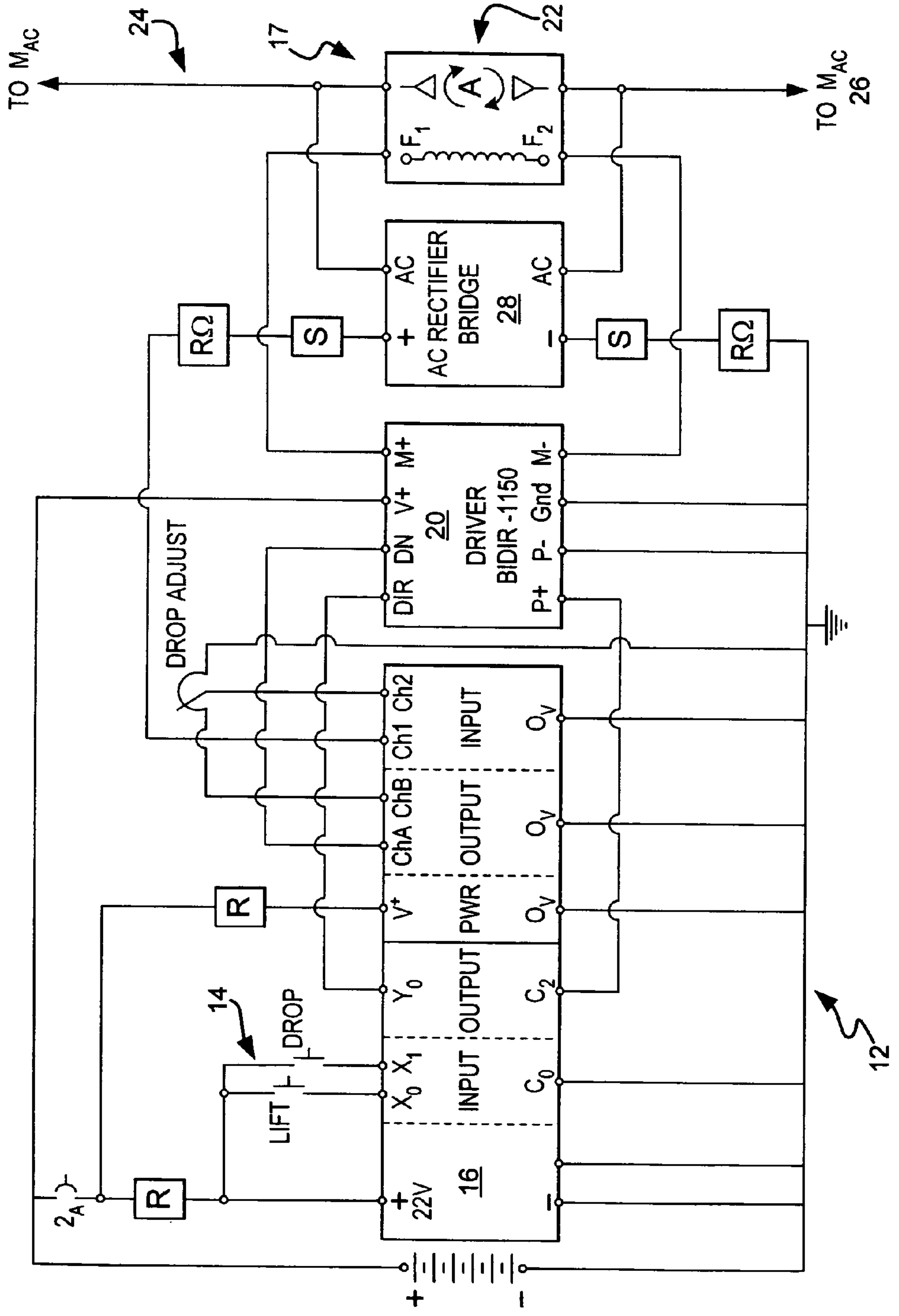
FIG. 2 is a schematic illustration of one embodiment of the present invention.

Referring now to FIG. 2, a preferred embodiment of the present invention is depicted and includes a circuit 12 operatively coupled to a voltage generator 17. The circuit 12 includes an operator interface 14, a controller 16 (CPU, or preferably a programmable logic controller (PLC)), an analog circuit card, a voltage driver 20, and an AC voltage rectifier bridge 28.

The operator interface 14 includes inputs, e.g., switches and buttons; and outputs, e.g., lights, displays, and speakers; to enable personnel to operate the moving device. The voltage driver 20 is operatively coupled to the generator field 18, which facilitates control of the generator 17. The rectifier 28 is operatively coupled to the generator's armature 22, which is also operatively coupled to an electromagnet 26. The rectifier 28 acts to align the polarity of the signal received from the generator 17 for further transmission to the controller 16. The output of the rectifier 28 is coupled to an input channel—Channel 1—of the PLC 16. Other circuitry can be utilized wherein additional circuits can be connected through any means known to one of ordinary skill in the field of electrical circuitry, e.g., wired, wireless; such that the coupling between the circuits—as well as any components described herein—is efficacious; that is, it produces the appropriate or designed effect.

A pair of control signals—attach (lift) and detach (release or drop)—emanate from the controller 16 and are transmitted to the generator field 18 via the driver 20. Transmission of the control signal from the controller 16 to the generator's input 18—field windings—affects the polarity and the magnitude of the magnetizing force of the electromagnet 26. That is, a lift control signal transmitted from the controller 16 to the generator field 18 results in a polarized adjustment to the voltage magnitude of the electromagnet 26. Thereafter, transmission of the drop (release) control signal from the controller 16 to the generator field 18 of the generator's armature 22 results in alternating the polarity and adjusting, e.g., reducing, the magnitude of the voltage at the electromagnet 26.

In response to a lift material signal being received from the operator interface 14, the control lift signal is transmitted from the controller 16 to the generator field 18. The output voltage of the armature 24 is monitored by the PLC 16 and further maintained by comparison to the set-point value and by subsequent control signals transmitted to the generator field 18. In short, the PLC 16 monitors the output voltage of the generator and—through the transmission of the control signal to the armature's field winding(s) 18—maintains the generator's output voltage at the desired level, which is substantially equivalent to the set-point value.

The operating sequence for lifting the magnetic material includes actuating the lift procedure via the interface control panel 14 wherein the controller 16 receives a command to initiate attachment of the magnetic material. The controller transmits a lift control signal—24 V(dc)—to the generator field 18 via the DC voltage driver 20 to enable the generation of a voltage output at the generator armature output that is substantially equal to the set-point value for the lift sequence. During the lift sequence, the generator armature output voltage 24 can be compared by the controller to the set-point value to maintain and/or adjust the generator armature output voltage as necessary. The set-point value utilized during the lift sequence is essentially a constant voltage value that is substantially equal to the voltage amount desired to energize the electromagnet, e.g., approximately 230 V(dc).

During the release of the magnetic material, the voltage output 24 of the armature 22 is monitored and fed back to the PLC 16 for comparison to the set-point value for the release or drop sequence. The set-point value is at least partially dependent upon the operating characteristics of the electromagnet and its determination is associated with the release of the largest pieces of magnetic material to be moved by the electromagnet. Generally, the set-point value utilized during the release or sequence of the magnetic material is empirically determined during an initial process wherein the operator monitors the voltage of the electromagnet during a lifting and dropping of magnetic materials. In response to the length of time required for the largest piece of magnetic material to be released from the electromagnet during this process, a set-point value for the drop sequence is determined. That is, the set-point value for the drop sequence is associated with the analog voltage level of the electromagnet 26 in relation to the time required for the largest piece of magnetic material to be released.

Figure 3:
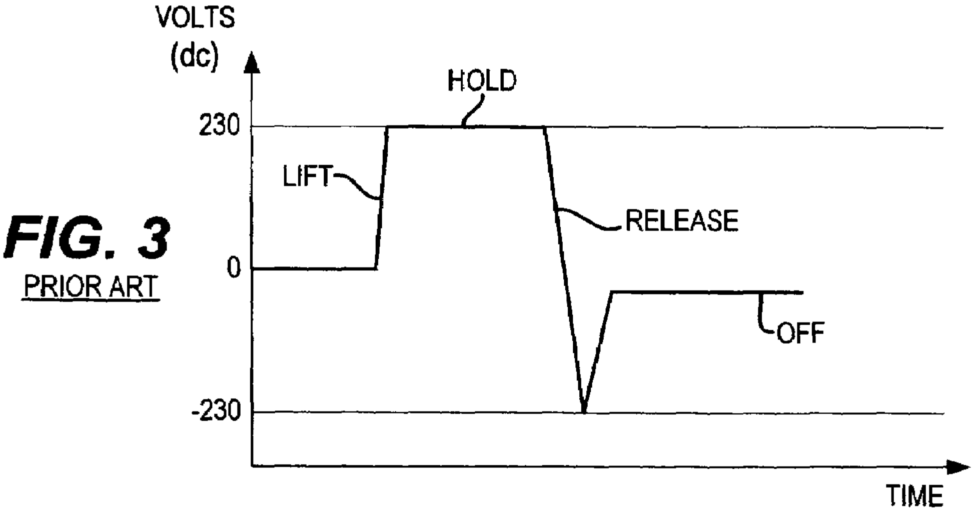
FIG. 3 PRIOR ART
FIG. 3 is a graphic illustration depicting voltage values of a prior art electromagnet during the lift and drop modes.

FIG. 3 is a graphic illustration depicting a voltage of a prior art lifting magnet during the lift and release—or drop—of a magnetic material. Initially, the voltage output of the electromagnet is increased to 230 V(dc) and then remains constant until the polarity of the voltage output from a generator is reversed, which causes the voltage level to drop to approximately −250 V(dc). When the generator is turned off, its voltage output eventually approaches 0 V.

Figure 4:
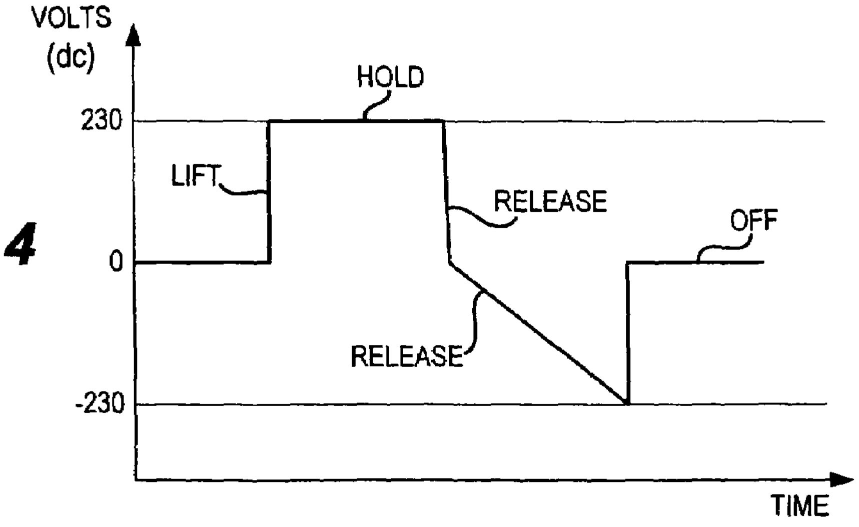
FIG. 4 is a graphic illustration depicting the voltage values of an electromagnet utilized in one embodiment of the present invention during the lift and drop modes; and, FIG. 5 is a flow chart of a method of one embodiment of the present invention for controlling an electromagnet during the release of magnetic material.

In contrast, FIG. 4 is a graphic illustration depicting a voltage at the electromagnet 12 of one embodiment of the present invention during the lift and release of the magnetic material. The initial voltage output of the electromagnet 12 is increased to 230 V(dc) and then remains constant until the drop control signal is transmitted from the controller, whereupon the polarity of the electromagnet voltage is effectively reversed so that the attached magnetic material can be released from the electromagnet. During the release of the magnetic material, the generator's output voltage is monitored and maintained in substantial alignment with the set-point value for the release sequence. In contrast to typical release mechanisms wherein the reverse polarized magnitude is essentially unchecked and thus susceptible to re-magnetizing the magnetic material to the electromagnet, the present invention maintains the voltage output of the armature to that substantially equal to the set-point, which allows for the magnetic material to fall away from the electromagnet and not retain residual magnetism.

More specifically, to drop the magnetic material from the electromagnet 26, the operator initiates the release sequence by actuating the appropriate input on the interface control panel 14 wherein the programmable logic controller 16 enables transmission of the first control signal—drop, 24 V(dc)—to the generator field 18. At about this time, the programmable logic controller 16 monitors the voltage output 24 of the armature 22—process variable—through an input channel (Channel 1). In response to the voltage output of armature 22 and its relation to the set-point value (Channel 2), the PLC will output a control signal (Channel A) to the DC driver 20, which is then transmitted into the field winding 18 of the generator to maintain the voltage output of the armature with the set-point value.

The controller 16 utilizes Channel A to transmit the control signal to the generator field 18 such that the voltage output 24 of the armature 22 is substantially equal to the set-point value. If the monitored voltage output 24 of the armature 22 varies from the set-point value during the drop cycle, the controller 16 will adjust the control signal from Channel A to the generator field 18 so that the generator's output voltage will be substantially the same as the set-point value. At the end of the set-point value, the magnetic material will have fallen from the electromagnet 12.

In one embodiment of the present invention, the set-point value for the drop sequence is a substantially linearly ramped voltage signal having a constant slope or rate and a duration of approximately two seconds. The PLC 16 monitors the voltage output of the armature 22 for comparison with the substantially linearly ramped set-point value, wherein subsequent control signals from the PLC—Channel A—to the armature field 18 maintains consistency of the armature's output voltage 24 with the set-point value to ensure release of the magnetic material without voltage overshoot, residual magnetism, and further alterations of polarity and magnitude reduction.

The duration and magnitude of the reverse voltage resulting at the electromagnet during the release of the magnetic material is set by a second input to the controller 16, Channel 2, which can be adjusted by the operator. For example, a setting adjustment of 50% preferably equates to a 1.0 second drop time with 115 VDC maximum; a setting of 100% equates to a 2.0 second drop time with 230 VDC maximum; and a setting of 10% equates to a 0.2 second drop time with 23 VDC maximum. At the end of the linearly ramped set-point value, the surface of the electromagnet will be clean and the PLC will disable the driver 20.

In general, the present invention utilizes the voltage output of a generator to more effectively demagnetize the electromagnet and reduce the amount of residual magnetism remaining on the released magnetic materials. That is, the voltage output of the generator's armature is sensed and compared to the predetermined set-point value, wherein a subsequently transmitted control signal is transmitted in response—at least partially—to the comparison of the sensed output voltage of the generator's armature voltage and the predetermined set-point value. As such, the present invention takes into consideration any speed or load fluctuation of the generator through constant monitoring of the generator's armature output voltage by the PLC 16 to continually compensate its output signal to the DC driver 20 to maintain the desired generator voltage output 24 as necessary.

Additionally, a scaling factor dependent upon the type of load bias applicable to the system, e.g., scrap or deep draw magnets, can also be incorporated into the determination of the ramp signal.

Figure 5:
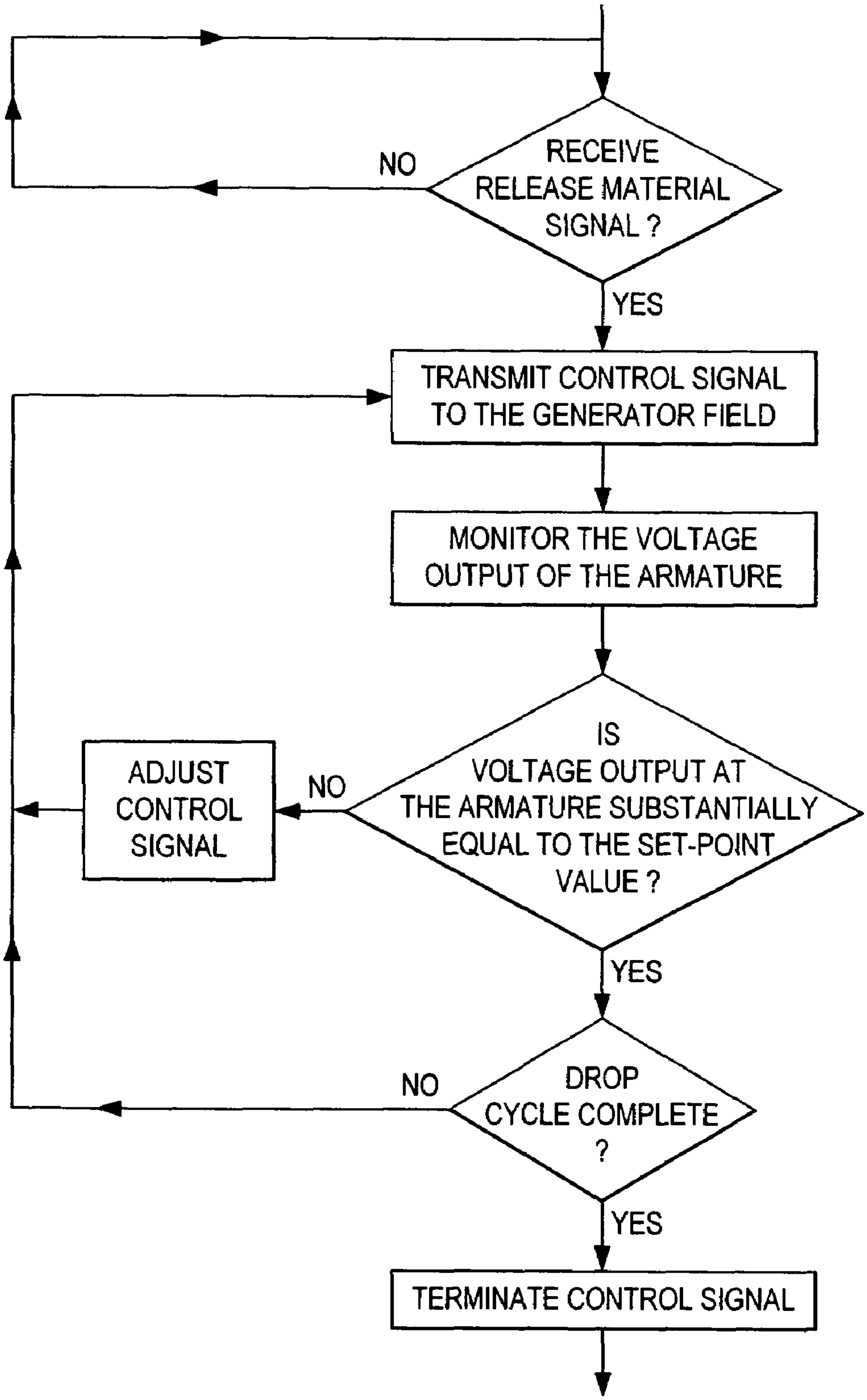

Referring now to FIG. 5, a flowchart is depicted for a method of controlling an electromagnet during the release of magnetic material in accordance with one embodiment of the present invention. The release of the magnetic material from the electromagnet is initiated by a release material signal transmitted from the interface control panel 14 and being received by the programmable logic controller 16. A control signal—drop—is transmitted from the programmable logic controller 16 to the generator field 18. The voltage output 24 of the generator armature 22 is monitored and compared against the earlier determined analog set-point value, wherein subsequent control signals are transmitted from the PLC to maintain the output voltage of the armature.

It is to be understood that the present invention may be embodied in other specific forms without departing from the spirit or central characteristics thereof. That is, any type of electrical components known to one of ordinary skill in the field of electrical circuit design that are capable of being utilized to accomplish the objects described herein are contemplated by the present invention. Such electrical components include, and are not limited to, computers, ammeters, volt meters, integrated circuitry, converters, sensors, monitors, comparators, wireless devices, and logic controllers. Furthermore, other embodiments of the present invention include—and are not limited to—utilization with coil lifters wherein more precise control of motor-driven telescoping legs or tongs is facilitated by the present invention described above. The present embodiments, therefore, are to be considered in all respects as illustrative and not restrictive, and the present invention is not to be limited to the details provided herein. Thus, while specific embodiments have been illustrated and described, numerous modification come to mind without significantly departing form the characteristics of the present invention and the scope of protection is only limited by the scope of the accompanying claims.

What is claimed is:

1. A method for controlling a device for moving magnetic material, the device including an electromagnet coupled to a voltage generator having a control input and a voltage output, the method comprising the steps of:

providing a set-point value to a controller for attaching or detaching magnetic material to an electromagnet;

transmitting a control signal to a control input of a voltage generator;

monitoring a voltage at a generator armature output;

comparing the voltage at the generator armature output with the set-point value; and, adjusting the control signal to maintain the generator armature output voltage substantially equal to the set-point value.

2. The method of claim 1, further comprising the step of receiving a release material signal from an operator interface, wherein the control signal is a drop signal and the set-point value is a substantially linear ramp voltage signal having a constant slope and a duration of approximately two seconds.

3. A system for moving magnetic material, the system including an electromagnet for attaching and detaching magnetic material, the system comprising:

a generator coupled to an electromagnet, the generator including a control input and an armature having a voltage output;

a sensor coupled to the armature's voltage output;

a set-point value; and, a controller coupled to the generator's control input and the sensor, the controller comprising:

a first input coupled to the set-point value;

a second input coupled to the armature's voltage output;

a comparator coupled to the first input and the second input; and, an output control signal responsive to the comparison of the first input and the second input, wherein the generator's voltage output is continuously maintained substantially equal to the set-point value.

4. The system of claim 3, wherein the set-point value includes a substantially linear ramp having a constant slope and a duration of approximately two seconds.

* * * * *